May 2, 1967
J. G. GETSINGER ETAL
3,317,306
PROCESS FOR CONCENTRATING WET-PROCESS PHOSPHORIC ACID
Filed Sept. 16, 1964
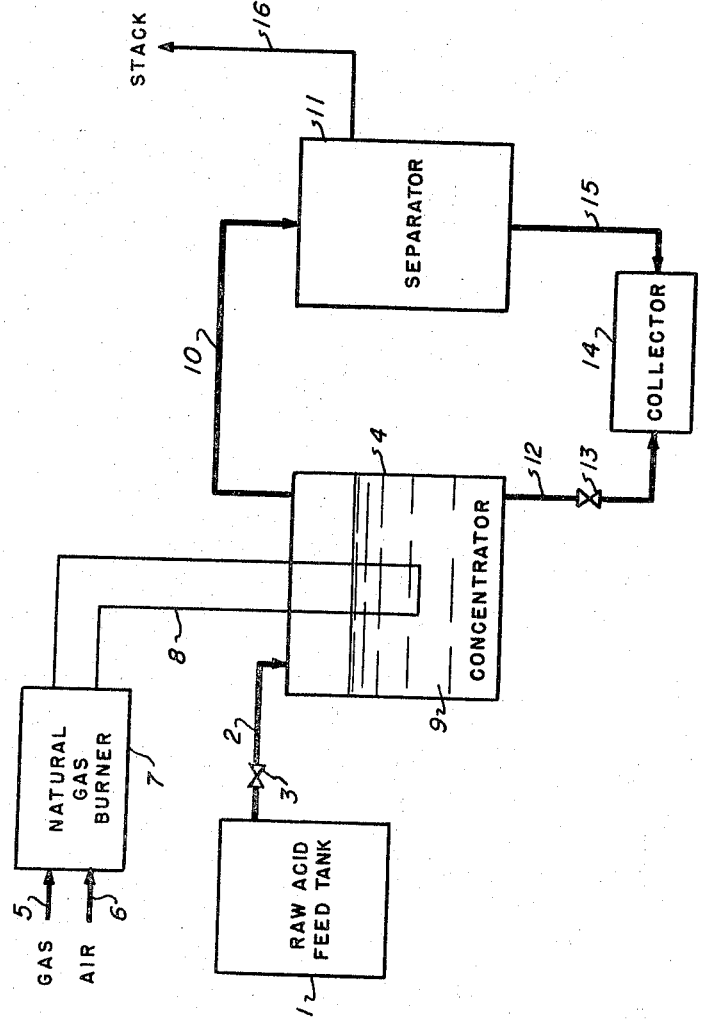
John G. Getsinger
William C. Scott INVENTORS.
BY Robert A. Petruck
Agent 3,317,306
PROCESS FOR CONCENTRATING WET-PROCESS PHOSPHORIC ACID
John G. Getsinger and William C. Scott, Florence, Ala., assignors to Tennessee Valley Authority
Filed Sept. 16, 1964, Ser. No. 397,046
5 Claims. (Cl. 71—43)

The invention described herein may be manufactured and used by or for the Government for governmental purposes without the payment of any royalty thereon.

This application is a continuation-in-part of application Ser. No. 131,942, filed Aug. 16, 1961, in the names of John G. Getsinger et al. and now abandoned; which application in turn is a continuation-in-part of copending application 835,377, filed Aug. 21, 1959, in the name of John G. Getsinger.

Our invention relates to an improved wet-process phosphoric acid useful in the preparation of ammoniated fertilizers, and more particularly to a process for the manufacture of a highly concentrated phosphoric acid containing $P_2O_5$ in the range from about 60 percent to about 76 percent by weight produced from wet-process phosphoric acid containing from about 30 percent to a maximum of about 54 percent $P_2O_5$.

Heretofore it has been the practice in the chemical industry to produce wet-process phosphoric acid by treating phosphate rock with sulfuric acid to effect the displacement of the phosphate ion in union with calcium by the sulfate ion. The resulting acid is subsequently drained or otherwise separated from the insoluble matter present in the phosphate rock or formed during this reaction. As a result of this relatively simple method, manufacture of wet-process phosphoric acid is very economical, but on the other hand it contains large quantities of impurities. These impurities are principally iron and aluminum compounds accompanied by other materials in the phosphate rock which may be soluble in the sulfuric acid. In the wet-process phosphoric acid so produced there is observed the voluminous precipitate of such impurities which settle out and form a sludge, thus rendering the acid difficult to store, pump, and otherwise handle. The disadvantages associated with the suspended solids comprising the precipitate have been found to severly limit the usefulness of wet-process phosphoric acid and, in many processes, these disadvantages are so great that they offset the economy otherwise associated with wet-process phosphoric acid as a source of $P_2O_5$. Removing the precipitate formed in the wet-process phosphoric acid after the acid has been stored for some time is not effective in overcoming the above-mentioned difficulties inasmuch as more precipitate forms as the acid stands. Furthermore, wet-process phosphoric acid always contains suspended solids to a greater or lesser degree. Some fine gypsum always comes through the filters associated with production of such acid, and a considerable quantity of said fine gypsum comes through when there are breaks in the filter cloth. During evaporation, the solubility of the calcium sulfate and fluosilicate is decreased and considerable precipitation occurs. It is generally accepted that phosphoric acid over 5 percent to 10 percent $P_2O_5$ in strength is almost always saturated with calcium sulfate and sodium and potassium fluosilicate. More concentrated acid may become saturated with iron and aluminum phosphates. All of these have a very pronounced tendency to supersaturate and consequently, when acid is allowed to stand and cool, solids continue to settle out of solutions for long periods, if not indefinitely. It is also generally accepted in the industry that the idea that you can clarify wet-process phosphoric acid and then forget about the problem is a misconception.

The formation of the above-mentioned precipitates in wet-process phosphoric acid is often increased by chemical reaction in processes in which attempts have been made to use the wet-process phosphoric acid. For example, reaction of wet-process phosphoric acid and ammonia has been observed to cause such voluminous precipitation that the precipitate formed quickly clogs nozzles, pumps, and associated equipment.

On the other hand, wet-process phosphoric acid has been found to be quite satisfactory when used in several processes where its impurities and associated precipitates formed therefrom are not objectionable. One such process is the acidification of phosphate rock in the formation of triple superphosphate fertilizer. The wet-process phosphoric acid used in such processes has been in the concentration of about 20 percent up to a maximum of about 54 percent $P_2O_5$. It has been generally accepted in the industry that this upper limit of 54 percent $P_2O_5$ is the maximum concentration to which wet-process phosphoric acid may be concentrated and that, if such acid is concentrated even slightly above this limit, the sludge resulting from the presence of the above-mentioned impurities and suspended solids renders such acid completely unusable.

We have developed a process for the production of concentrated wet-process phosphoric acid which overcomes these disadvantages of the prior art. We have developed a reliable, simple and efficient method for the production of wet-process phosphoric acid which forms substantially no precipitates on standing. We have discovered that, contrary to the view accepted by industry, the physical properties of wet-process phosphoric acid drastically change when such acid is concentrated above a critical $P_2O_5$ content. Furthermore, we have found that, in carrying out the process for manufacturing such concentrated wet-process phosphoric acid, another factor which appears to be highly critical in producing the product of our invention is the period of time during which the raw, viz ordinary wet-process, phosphoric acid is retained in the concentrating apparatus. Still further we have found that we can minimize the formation of aerosols, i.e. minute droplets of phosphoric acid, in the exhaust gases, which aerosols are extremely corrosive and toxic, by reducing the temperature of the combustion gases before they contact the acid which is being concentrated.

It is therefore an object of the present invention to provide a process for the manufacture of concentrated wet-process phosphoric acid which forms substantially no precipitates upon standing.

Another object of the present invention is to provide a process for the manufacture of highly concentrated wet-process phosphoric acid which forms substantially no precipitates upon standing, and which does not form a voluminous precipitate when subsequently ammoniated.

Still another object of the present invention is to provide a process for the manufacture of a fluid, highly concentrated wet-process phosphoric acid having low viscosity at room temperature, which forms substantially no precipitates on standing, and which has a $P_2O_5$ content in the range from about 60 percent to 76 percent.

A further object of the present invention is to provide a process for the production of a highly concentrated wet-process phosphoric acid in which the chelating characteristics of impurities present in the acid raw material are utilized in a novel manner.

A still further object of the present invention is to provide a process for the manufacture of highly concentrated wet-process phosphoric acid containing substantial proportions of pyro-, tripoly-, and the higher acyclic polymers in the polyphosphoric acid system.

A still further object of the present invention is to provide a process for the manufacture of a fluid, highly concentrated wet-process phosphoric acid which subsequently may be easily ammoniated in a process for the production of liquid fertilizer solutions having plant-food content higher than that ordinarily resulting from the ammoniation of commercially available wet-process phosphoric acid, which process is characterized by the fact that the formation of aerosols in the exhaust gases therefrom is reduced to a minimum.

We have discovered that the foregoing and other objects of the present invention can be attained by a process for the manufacture of fluid, highly concentrated wet-process phosphoric acid substantially free of solids, which comprises concentrating wet-process phosphoric acid, containing in solution substantially all of the congeneric impurities extracted from phosphate rock during manufacture, to a $P_2O_5$ concentration in the range from about 60 percent to 76 percent and forming substantial proportions of polyphosphoric acids therein, said polyphosphoric acids containing orthophosphoric acid and substantial portions of pyrophosphoric acid, tripolyphosphoric acid, and higher acyclic polymers of phosphoric acid. We have also discovered that the lowest practical combustion temperature provides the lowest aerosol losses; and for efficient plant operation and to avoid excessive gas loading in the system we prefer that the temperature of the inlet combustion gas be between 1000° F. and 2000° F.

In carrying out the objects of our invention in one form thereof, we employ a continuous concentrator in which is maintained a pre-determined level of highly concentrated wet-process phosphoric acid and to which concentrator is fed a stream of raw wet-process phosphoric acid of a concentration up to about 54 percent $P_2O_5$. Hot combustion gases or other evaporating means are employed in the concentrator to drive off excess moisture and to maintain a "heel" of concentrated product. Maintenance of a "heel" of concentrated acid in the continuous concentrator has been found to be effective in precluding formation of foam which is otherwise normally encountered when this acid is heated or batch concentrated.

The present invention is based on our discovery that if the concentration of wet-process phosphoric acid is carried beyond the range of the present commercial practice (a maximum of 54 percent $P_2O_5$) the resulting acid will become free of solids. This change in physocial properties has been observed to occur when the concentration reaches above about 60 percent $P_2O_5$. Acid concentrated above about 68 percent to 72 percent has been observed to remain substantially fluid when subsequently cooled to room temperatures. In fact, some acids, depending upon the source of the original phosphate rock from which the low-grade leach acid was produced, have been observed to remain in a substantially fluid phase when subsequently cooled to room temperature or slightly above when concentrated up to about 76 percent $P_2O_5$. This discovery is also unexpected in that pure furnace phosphoric acid is not fluid in this range of $P_2O_5$ concentrations, but rather it is fluid only in the relatively narrow range between 75 percent and 77 percent $P_2O_5$ content. The present invention is also based upon the unexpected discovery that if the wet-process phosphoric acid is exposed to the concentration step for a period of time greater than 20 minutes, the desirable objectives of the present invention are not fully realized. We have discovered that a retention time of about 5 to 20 minutes for the acid in the concentrator yields a product having the most desirable characteristics and, more particularly, that if the material is retained in the concentrator for a period of more than about 20 minutes the product resulting therefrom will not be completely free of solids. Therefore, a retention time of approximately 5 to 20 minutes is a highly critical factor in our invention. Although a retention time of substantially less than the period stated above may not be feasible, depending upon the dictates of the existing concentrators and other associated equipment, the use of a flash-type evaporator may allow for a shorter retention time, i.e., one to five minutes: the criticality of the retention time residing in the upper limit of 20 minutes. In addition to the above unexpected discovery of a relatively short retention time, we have also discovered that the lowest practical combustion temperature of the inlet gases provides the lowest losses of entrapped minute droplets of phosphoric acids in the exhaust gases. For efficient plant operation and to avoid excess gas loading in the system, as noted above, we prefer that the temperature of the combustion gases be held in the range between about 1000° F. and about 2000° F. The temperature of these gases can be regulated by any suitable means, e.g. by introduction of a cool diluent gas, such as air, nitrogen, or recycled stack gases, into the gas burner. Preferably natural gas having a heating capacity of about 1000 B.t.u. per cubic foot is premixed with air, supplied to the burner, ignited, and the high combustion gases are diluted to obtain a temperature of about 1600° F. by supplying air in the amount of about 50 to 150 percent of that required for combustion to the gas burner.

Our invention, together with further objects and advantages thereof, will be better understood from a consideration of the following description taken in connection with the accompanying drawing in which:

The drawing is a diagrammatical illustration of the principles of our novel process showing the flow of materials which results in a highly concentrated, fluid, wet-process phosphoric acid substantially free of solids and containing in solution substantially all of the congeneric impurities originally extracted from phosphate rock during manufacture of ordinary wet-process phosphoric acid.

Referring now more specifically to the drawing, commercially available phosphoric acid material containing up to a maximum of about 54 percent $P_2O_5$ is fed from source 1 via line 2 and means for control of feed rate 3 into concentrator 4. Natural gas or other available hydrocarbon-containing fluid from a source not shown is fed via line 5 along with combustion air via line 6 into gas burner 7. As referred to supra, excess amounts of air may be fed to burner 7 in amounts of about 50 to 150 percent of that required for combustion to ensure that the temperature of the inlet gases to concentrator 9 via line 8 are in the range of about 1000° F. to about 2000° F. Such excess air may be, for instance, supplied to burner 7, along with regular air required for combustion via line 6. Hot combustion gases from burner 7 are led via line 8 into concentrator 4 and beneath the surface of a "heel" of concentrated wet-process phosphoric acid 9 maintained therein. Effluent and offgases which may contain entrained droplets of concentrated acid are fed via line 10 to separator 11. The highly concentrated wet-process phosphoric acid product is withdrawn from concentrator 4 via line 12 and means for control 13 to collector 14. In addition, the droplets originally entrained in the offgas are separated in separator 11 and fed via line 15 to collector 14. The stack gases containing water vapor and products of combustion are exhausted from separator 11 via line 16 to the atmosphere.

We have found that the concentrated acid produced by our process is quite fluid in a $P_2O_5$ concentration range from about 60 percent to 76 percent. At above about 70 percent $P_2O_5$ content the acid in some cases, depending upon the composition of the phosphate rock originally employed in producing the raw material, is somewhat viscous but pumpable. Above about 70 percent the acid tends to become viscous at temperatures below about room temperature. However numerous samples of acids concentrated upwards to 76 percent $P_2O_5$ can be handled as a viscous liquid at temperatures near or slightly above room temperature. The acid resulting from our process has been observed to deposit practically no precipitates upon long storage. It has been determined that this acid contains, in addition to orthophosphoric acid, substantial forms of other phosphoric acids present in the polyphosphoric acid system. Among these polyphosphoric acids are pyrophosphoric acid, tripolyphosphoric acid, and perhaps higher acyclic polymers of polyphosphoric acid.

Polyphosphoric acid is a generic term used to define the phosphoric acids having less water of constitution than orthophosphoric acid. Whereas orthophosphoric acid contains one atom of phosphorus per molecule and has a theoretical mol ratio of water to phosphorus pentoxide of 3.0 or greater, the polyphosphoric acids have two or more atoms of phosphorus in a chain or ring structure in alternating sequence with oxygen, and a theoretical mol ratio of water to phosphorus pentoxide less than 3. Polyphosphoric acid has two general forms, the acyclic and the cyclic, said cyclic commonly called metaphosphoric acid. In the acyclic form, which is derived by limited molecular dehydration of orthophosphoric acid, the individual chains of phosphorus and oxygen atoms have terminal ends and a theoretical mol ratio of water to phosphorus pentoxide between 2 and 3. In metaphosphoric acid, which is derived from the acyclic form by continued molecular dehydration the chain is endless, forming ring structures. Metaphosphoric acids have theoretical mol ratios of water to phosphorus pentoxide of 2 or less. In practicing my invention, the acyclic species is formed by concentration of the ortho form, however, the concentration or dehydration of the acid is stopped before the meta species is formed, since not only is this species ineffective in preventing the formation of precipitates in neutral salt solutions, but metaphosphoric acid forms salts with the metal impurities which are also insoluble in the acid.

The empirical formula for the desired acyclic polyphosphoric acid is:

$$H_{n+2}P_nO_{3n+1}$$

where:

H represents hydrogen.
P represents phosphorus.
O represents oxygen, and $n$ is greater than 1.

When $n=2$, the species is commonly known as pyrophosphoric acid; when $n=3$, the species is tripolyphosphoric acid.

The formation of these polyphosphoric acids in whatever polymers are present is believed to be enhanced by the presence of the impurities normally contained in wet-process phosphoric acid. In any event, large quantities of non-orthophosphoric acids are present at a $P_2O_5$ concentration range far below that range with which these polyphosphoric acids are associated, formed in pure furnace phosphoric acid. It has been postulated that possibly the impurities originally present in the raw material wet-process phosphoric acid actually enter into complex reactions resulting in the formation of the condensed acids or that these impurities act to displace water, thereby increasing the $P_2O_5$: water ratio for a given concentration of $P_2O_5$ with the resulting formation and occurrence of the higher polymers of polyphosphoric acid at $P_2O_5$ concentration ranges far below the ranges ordinarily predicted at which such polymers have been found to occur. (See Canadian Journal of Chemistry, vol. 34 (1956), pages 791 and 792.)

The highly concentrated wet-process phosphoric acid resulting from the present invention, containing from about 60 percent to 76 percent $P_2O_5$, is remarkable not only in that it does not form precipitates upon subsequent standing, but that upon further treatment, viz ammoniation, the voluminous precipitates which have been observed to normally occur are not formed. Thus, wet-process phosphoric acid concentrated according to our teachings may be ammoniated and used in producing high-analysis liquid fertilizers. We have found that the only restriction upon ammoniation of the product of our process is that the temperature of the concentrated acid must be controlled below that at which hydrolysis of the higher polyphosphoric acids therein would occur. Such a resulting ammoniated solution has been found to be an excellent liquid fertilizer in that precipitates therein do not form upon standing. The ammoniated solutions, which may contain upwards of 50 percent plant food, contain ammonium salts of substantially unhydrolyzed highly concentrated wet-process phosphoric acid and therefore contain substantial amounts of ammonium salts of pyrophosphoric acid, tripolyphosphoric acid, and higher acyclic polyphosphoric acids. The distribution of these ammonium salts of the non-orthophosphoric acids has been observed to be different from that which would result if highly concentrated, pure furnace acid, commonly referred to as superphosphoric acid, were ammoniated. This phenomenon is believed to occur by the shift in the ratio of $P_2O_5$:water resulting from the increase in the $P_2O_5$:water ratio for a given concentration of $P_2O_5$ resulting from the displacement of water by the congeneric impurities originally present in the raw material feed. The exact composition and distribution of these substantially unhydrolyzed ammonium salts has not yet been determined; however, their occurrence at $P_2O_5$ concentration ranges substantially below the ranges at which they would be predicted from the distribution shown in the Canadian Journal of Chemistry, referred to above, appears to enhance the products' characteristics and to result in an improved liquid fertilizer having superior "chelating" properties. Thus, a liquid fertilizer prepared by ammoniating the highly concentrated wet-process phosphoric acid resulting from our process, when applied to the soil, appears to exhibit the desirable tendency to make available trace minerals therein.

In order that those skilled in the art may better understand how the present invention can be practiced, the following examples are given by way of illustration and not by way of limitation.

*Example I*

A number of concentration tests were carried out in apparatus similar to that shown in FIGURE 1 to study the effect of retention time in the evaporator on formation of the acid-insoluble impurities, particularly iron-aluminum tripolyphosphate. The tests were made with commercially available wet-process phosphoric acids obtained from various sources. The temperatures of the inlet gas to the evaporator, and of the acid pool in the evaporator, were held constant at 1250° F. and 500° F., respectively. The feed acids contained about 52 percent $P_2O_5$ and were concentrated to about 70 percent $P_2O_5$.

Retention time was varied by changing the acid feed rate. Feed rates and corresponding retention times based on static volume of the acid pool in the evaporator are shown below, and for purposes of comparison, feed rates and retention times for both small-scale tests and pilot-plant tests are included.

| Small Scale | | Pilot Plant | |
| --- | --- | --- | --- |
| Feed rate, g. $P_2O_5$/min. | Retention time, min. | Feed rate, lb. $P_2O_5$/hr. | Retention time, min. |
| 10 | 60 | 250 | 100 |
| 20 | 30 | 500 | 50 |
| 30 | 20 | 1,000 | 25 |
| 40 | 15 | | |
| 50 | 12 | | |

The results of these tests using wet-process phosphoric acid from two different sources indicate that products made at a retention time of about 12 minutes contained substantially no solids and that the solid contents increased with increased retention time above about 12 minutes. The water-insoluble solid contents in the concentrated acids were as follows:

| Retention time, min | 60 | 30 | 20 | 15 | 12 |
|---|---|---|---|---|---|
| Water-insoluble solids, percent by wt.: | | | | | |
| Acid from source A [1] | 18.7 | | 24.6 | 0.9 | 0.4 |
| Acid from source B [2] | 4.0 | 4.5 | 2.5 | 0.8 | 0.3 |

[1] Feed acid contained about 2 percent water-insoluble solids.
[2] Feed acid contained about 0.3 percent water-insoluble solids.

From the data obtained in these tests, it was apparent that a retention time of less than about 15, or more particularly about 12 minutes, is required to prevent formation of the solids in the acids employed. However, in another test carried out in the same series an acid from a third source was exposed to a retention time up to about 50 minutes, and it was found that no solids were formed when the retention time was less than about 18 minutes.

Example II

A series of five pilot-plant tests using equipment similar to that shown in FIGURE 1 was conducted with filter-grade acid (about 30% $P_2O_5$). In one test, the filter-grade acid was concentrated to about 69 percent $P_2O_5$ in one step. In other tests, the filter-grade acid was concentrated to about 57 percent $P_2O_5$, allowed to settle for about 3 weeks, and then decanted from the settled solids and further concentrated to about 71 percent $P_2O_5$.

In Test 1, acid was concentrated in one step from 29.9 to 68.8 percent $P_2O_5$ at a feed rate of 172 pounds of $P_2O$ per hour. Mechanical operation of the equipment was satisfactory. The temperature of the acid pool in the evaporator averaged 499° F., and the heat input amounted to $9.2 \times 10^6$ B.t.u. per ton of $P_2O_5$ fed. Loss of $P_2O_5$ in the exhaust gas amounted to 2.2 percent of the $P_2O_5$ fed.

Test 2 was the first stage of two-stage concentration tests. The acid was concentrated from 30.6 to about 57 percent $P_2O_5$. The feed rate was about 250 pounds of $P_2O_5$ per hour. The acid-pool temperature was about 255° F. Heat input amounted to 5.2–5.4 × 10⁶ B.t.u. per ton $P_2O_5$ fed. Heat requirements reported for true submerged combustion evaporators in concentrating acid from about 30 to 54 percent $P_2O_5$ are about $4.5 \times 10^6$ B.t.u. per ton $P_2O_5$ fed. $P_2O_5$ loss in the exhaust gas was 0.7 percent of the $P_2O_5$ fed.

The product acid from Test 2 was stored and allowed to settle for 3 weeks. The water-insoluble solids content of the acid before storage was about 0.2 percent by weight. After settling for 3 weeks, the supernatant acid was decanted for use as feed in Tests 3 and 4. The water-insoluble solids content of the decanted acid was also about 0.2 percent, but the solids content of the residue was about 25 percent. This showed that precipitation of solids had occurred to an appreciable extent during the settling period, as expected. Microscopic examination of the solids in the residue showed that the major phase was calcium sulfate (anhydrite), but iron aluminum tripolyphosphate and iron trimetaphosphate $[Fe(PO_3)_3]$ also were present as minor phases. A summary of the data and results from these tests are shown in Table I.

TABLE I.—SUMMARY OF DATA AND RESULTS FOR RUN 10: PILOT-PLANT CONCENTRATION OF FILTER-GRADE ACID

| | Test Number | | | |
|---|---|---|---|---|
| | 1 | 2 | 3 | 4 |
| Length of test, hr | 4.6 | 6 | 6.5 | 4.6 |
| Feed rate, lb. $P_2O_5$/hr | 170 | 250 | 250 | 253 |
| Heat input from combustion of natural gas, B.t.u., gross: | | | | |
| Per ton $P_2O_5$ fed | 9.2×10⁶ | 5.2×10⁶ | 4.14×10⁶ | 4.14×10⁶ |
| Per lb. $H_2O$ evaporated | 2,446 | 1,684 | 5,819 | 5,404 |
| Temperature (av.), °F.: | | | | |
| Inlet gas | 1,704 | 1,682 | 1,595 | 1,700 |
| Acid pool | 499 | 255 | 526 | 549 |
| Evaporator exhaust gas | 485 | 271 | 513 | 528 |
| Stack gas | 244 | 172 | 176 | 186 |
| Chemical analysis, percent by wt.: | | | | |
| Feed acid: | | | | |
| $P_2O_5$ | 29.9 | 30.6 | 56.5 | 56.2 |
| F | 1.9 | 1.5 | 0.5 | 0.6 |
| $SO_3$ | 2.0 | | 3.1 | 3.2 |
| $Al_2O_3$ | 1.0 | | 1.4 | 1.5 |
| $Fe_2O_3$ | 0.7 | | 1.4 | 1.4 |
| $H_2O$ insoluble solids | | 0.1 | 0.2 | 0.2 |
| Product acid: | | | | |
| Total $P_2O_5$ | 68.8 | 57.6 | 70.9 | 71.6 |
| Ortho $P_2O_5$, water soluble | 44.6 | 57.0 | 35.9 | 31.3 |
| Nonortho, percent of total | 35.2 | 1.0 | 49.4 | 56.3 |
| F | 0.3 | 0.42 | 0.2 | 0.2 |
| $SO_3$ | 3.9 | 3.5 | 3.0 | 2.7 |
| $Al_2O_3$ | 1.9 | 1.4 | 1.7 | 1.7 |
| $Fe_2O_3$ | 1.0 | 1.2 | 1.7 | 1.7 |
| $H_2O$ insoluble solids | 5.0 | 0.1 | 1.2 | 4.6 |
| $P_2O_5$, percent of feed: | | | | |
| In exhaust gas | 2.2 | 0.7 | 0.9 | 1.1 |
| In product | 94.5 | 93.3 | 96.8 | 98.0 |
| Unaccounted for | 3.3 | 6.0 | 2.3 | 0.9 |

Example III

A series of tests was completed in equipment similar in design to that shown in the drawing with merchant-grade acid (55% $P_2O_5$). Tests were made at feed rates of 500, 450, and 350 pounds of $P_2O_5$ per hour to study the effect of retention time on formation of acid-insoluble tripolyphosphates and to study the effect of feed rate on stack losses with the modified evaporator. The following tabulation shows the relationship based on static volume of the acid pool, between feed rate and retention time for the modified and for the original evaporators.

| Feed rate, lb. $P_2O_5$/hr | 350 | 400 | 450 | 500 |
|---|---|---|---|---|
| Retention time, min.: | | | | |
| Modified evaporator | 15 | 13 | 11.5 | 10.4 |
| Original evaporator | 71 | 63 | 55 | 50 |

In these tests, the temperature of the inlet gas to the evaporator was controlled at about 1700° F. The temperature of the acid bath was in the range of 520° to 545° F. The bath temperatures were kept somewhat higher than in some of the previous tests (usually about 500° to 510° F.) in an effort to obtain product concentrations of at least 70 percent $P_2O_5$. Mechanical operation of the pilot plant was good in each test. The amount of product collected from the separator was not measured, but the flow of acid was observed frequently.

Losses of $P_2O_5$ in the stack gases ranged from 1.2 to 3.1 percent of the amount fed, which was generally higher than losses encountered in similar tests made before the evaporator was changed (0.8 to 1%). The heat input in these tests ranged from 3.03 to $3.57 \times 10^6$ B.t.u. per ton of $P_2O_5$ fed.

A summary of the data and results from these tests is shown in Table II.

Table II.—Concentration of Merchant-Grade Acid

| | Test Number | | | |
|---|---|---|---|---|
| | 1-A | 2 | 3 | 4 |
| Length of test, hr | 3.58 | 4.17 | 4.75 | 4.0 |
| Feed rate, lb. $P_2O_5$/hr | 500 | 450 | 400 | 350 |
| Heat input from combustion of natural gas, B.t.u., gross: | | | | |
| Per ton $P_2O_5$ fed | $3.03 \times 10^6$ | $3.30 \times 10^6$ | $3.23 \times 10^6$ | $3.57 \times 10^6$ |
| Per lb. $H_2O$ evaporated | 3,642 | 3,918 | 3,875 | 4,262 |
| Temperature (av.), ° F.: | | | | |
| Inlet gas | 1,701 | 1,704 | 1,699 | 1,699 |
| Acid pool | 534 | 542 | 535 | 524 |
| Evaporator exhaust gas | 512 | 521 | 506 | 497 |
| Separator exhaust gas | 408 | 410 | 393 | 391 |
| Stack gas | 273 | 268 | 256 | 244 |
| Chemical analysis, percent by wt.: | | | | |
| Feed acid: | | | | |
| $P_2O_5$ | 55.3 | 55.5 | 55.5 | 55.2 |
| F | 0.73 | 0.76 | 0.78 | 0.75 |
| $SO_3$ | | | 2.8 | |
| $Al_2O_3$ | | | 1.3 | |
| $Fe_2O_3$ | | | 1.4 | |
| $H_2O$ insoluble solids | | | 1.5 | |
| Product acid: | | | | |
| Total $P_2O_5$ | 71.8 | 72.4 | 72.2 | 71.8 |
| Ortho $P_2O_5$, water soluble | 38.4 | 34.4 | 32.7 | 35.3 |
| Nonortho, percent of total | 46.5 | 52.5 | 54.7 | 50.8 |
| F | 0.35 | 0.33 | 0.32 | 0.35 |
| $SO_3$ | 2.1 | 2.4 | 2.6 | 2.7 |
| $Al_2O_3$ | 1.8 | 1.7 | 1.8 | 1.8 |
| $Fe_2O_3$ | 1.8 | 1.8 | 1.8 | 1.8 |
| $H_2O$ insoluble solids | 0.3 | 0.2 | 0.2 | 0.2 |
| $P_2O_5$, percent of feed: | | | | |
| In exhaust gas | 3.07 | 1.23 | 2.00 | 1.53 |
| In product acid | 88.50 | 97.30 | 91.50 | 98.90 |
| Unaccounted for | [1] 8.43 | 1.47 | [2] 6.50 | 0.0 |

[1] Feed and product pumps leaked badly during this test.
[2] Mostly as the result of spillage.

The acid-insoluble nonorthophosphate formed in earlier tests with some acids has been identified by the Analytical Laboratory as a tripolyphosphate of iron and aluminum. Diluted samples of the products from each of these tests were checked visually for the presence of the solid tripolyphosphate, but none was observed. Also, the water-insoluble solids contents of the products were very low, about 0.2 percent by weight as compared with about 6 to 15 percent previously found in product samples in which the tripolyphosphate was observed. However, a few crystals of the tripoly phosphate were observed by microscopic examination of samples from Tests 1-A and 3. Examination of these crystals indicated that they may have been carried over from the feed acid and not produced in the concentrator.

While we have shown and described particular embodiments of our invention, modifications and variations thereof will occur to those skilled in the art. We wish it to be understood, that the appended claims are intended to cover such modifications and variations and variations which are within the true scope and spirit of our invention.

What we claim as new and desire to secure by Letters Patent of the United States is:

1. In an improved process for the production of a fluid, highly concentrated wet-process phosphoric acid substantially free of iron aluminum tripolyphosphate, which process comprises the steps of continuously feeding commercially available wet-process phosphoric acid containing in the range from about 30 percent by weight $P_2O_5$ to about 54 percent by weight $P_2O_5$ into evaporating means; maintaining the material in said evaporating means at a temperature in the range of about 450° F. to about 600° F.; and withdrawing as product from said evaporating means a highly concentrated fluid wet-process phosphoric acid substantially free of solids, containing from about 60 to 76 weight percent $P_2O_5$ and containing in solution substantially all of the congeneric impurities originally present in said commercially available wet-process phosphoric acid fed to said evaporating means, the improvement in combination therewith for preventing the formation of the acid insoluble undesirable salts of iron aluminum tripolyphosphate in the resulting concentrated wet-process phosphoric acid, which improved process comprises the additional step of retaining in said evaporating means for a period of time from about 1 minute but less than about 20 minutes the wet-process phosphoric acid being concentrated therein prior to withdrawing same as product from said evaporating means.

2. In an improved process for the production of a fluid, highly concentrated wet-process phosphoric acid substantially free of iron aluminum tripolyphosphate, which process comprises the steps of continuously feeding commercially available wet-process phosphoric acid containing in the range from about 30 percent by weight $P_2O_5$ to about 54 percent by weight $P_2O_5$ into evaporating means; maintaining the material in said evaporating means at a temperature in the range of about 450° F. to about 600° F.; and withdrawing as product from said evaporating means a highly concentrated, fluid wet-process phosphoric acid substantially free of solids, containing from about 60 to 76 weight percent $P_2O_5$, containing in solution substantially all of the congeneric impurities originally present in said commercially available wet-process phosphoric acid fed to said evaporating means, and containing substantial proportions of pyrophosphoric acid, tripolyphosphoric acid, and higher polymers of polyphosphoric acid, the improvement in combination therewith for preventing the formation of the acid insoluble undesirable salts of iron aluminum tripolyphosphate in the resulting concentrated wet-process phosphoric acid, which improved process comprises the additional step of retaining in said evaporating means for a period of time from about 1 minute but less than about 20 minutes wet-process phosphoric acid being concentrated therein prior to withdrawing same as product from said evaporating means.

3. In an improved process for the production of a high-analysis, liquid mixed fertilizer substantially free of iron aluminum tripolyphosphate, which process comprises the steps of continuously feeding commercially available wet-process phosphoric acid containing in the range from about 30 percent by weight $P_2O_5$ to about 54 weight percent $P_2O_5$ into evaporating means; maintaining the material in said evaporating means at a temperature in the range of about 450° F. to about 600° F.; withdrawing from said evaporating means a highly concentrated fluid wet-process phosphoric acid substantially free of solids, containing about 60 to 76 weight percent $P_2O_5$, and containing in solution substantially all of the congeneric impurities originally present in said commercially available wet-process phosphoric acid fed to said evaporating means; subsequently introducing an ammoniating fluid to said highly concentrated phosphoric acid; maintaining the resulting solution of unhydrolyzed ammonium salts at a temperature in the range of about 180° F. to about 210° F. during introduction of said ammoniating fluid; and withdrawing the resulting solution as product, the improvement in combination therewith for preventing the formation of the acid insoluble undesirable salts of iron aluminum tripolyphosphate in the resulting concentrated wet-process phosphoric acid, which improved process comprises the additional step of retaining in said evaporating means for a period of time from about 1 minute but less than about 20 minutes the wet-process acid being concentrated therein prior to withdrawing same as product from said evaporating means.

4. The process of claim 1 wherein the residence time is in the range from about 1 to about 10 minutes.

5. The process of claim 1 wherein the residence time is in the range from about 1 to about 5 minutes.

References Cited by the Examiner

UNITED STATES PATENTS

| 2,895,799 | 7/1959 | LeBaron et al. | 23—165 |
| 2,905,535 | 9/1959 | Atkin et al. | 23—260 X |
| 2,999,010 | 9/1961 | Striplin et al. | 23—165 |
| 3,044,851 | 7/1962 | Young | 23—107 |

S. LEON BASHORE, *Acting Primary Examiner.*

DONALL H. SYLVESTER, *Examiner.*

A. SCIAMANNA, T. KILEY, *Assistant Examiners.*